(12) United States Patent
Usher et al.

(10) Patent No.: US 10,506,329 B2
(45) Date of Patent: *Dec. 10, 2019

(54) ACOUSTIC DAMPENING COMPENSATION SYSTEM

(71) Applicant: Staton Techiya, LLC, Delray Beach, FL (US)

(72) Inventors: John Usher, Beer (GB); Steve Goldstein, Delray Beach, FL (US)

(73) Assignee: Staton Techiya, LLC, Delray Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/179,171

(22) Filed: Nov. 2, 2018

(65) Prior Publication Data

US 2019/0075391 A1 Mar. 7, 2019

Related U.S. Application Data

(63) Continuation of application No. 14/109,987, filed on Dec. 18, 2013, now Pat. No. 10,123,110, which is a continuation of application No. 12/044,727, filed on Mar. 7, 2008, now Pat. No. 8,625,812.

(60) Provisional application No. 60/893,617, filed on Mar. 7, 2007.

(51) Int. Cl.
*H04R 1/10* (2006.01)
*G01H 3/00* (2006.01)

(52) U.S. Cl.
CPC ............ *H04R 1/1083* (2013.01); *G01H 3/00* (2013.01)

(58) Field of Classification Search
CPC .... H04R 5/033; G10L 15/00; G06K 9/00335; H03G 3/32; H04S 7/304
USPC .......................... 381/56, 72, 74, 60; 704/231
See application file for complete search history.

(56) References Cited

U.S. PATENT DOCUMENTS

| | | |
|---|---|---|
| 3,849,602 A | 11/1974 | Gendin |
| RE34,236 E | 4/1993 | Taylor |
| 5,668,883 A | 9/1997 | Abe et al. |
| 5,761,314 A | 6/1998 | Inanaga et al. |
| 6,385,322 B1 | 5/2002 | Mietling |
| 6,473,625 B1 | 10/2002 | Williams et al. |
| 6,741,707 B2 | 5/2004 | Ray et al. |
| 7,031,476 B1 | 4/2006 | Chrisop et al. |
| 7,177,433 B2 | 2/2007 | Sibbald |
| 7,697,891 B2 | 4/2010 | Desrosier et al. |
| 7,715,568 B2 | 5/2010 | Nakano |
| 8,131,390 B2 | 3/2012 | Braithwaite et al. |
| 2003/0040910 A1 | 2/2003 | Bruwer |
| 2003/0081739 A1* | 5/2003 | Hikishima ........... H04M 1/6058 379/88.01 |
| 2003/0159075 A1 | 8/2003 | Miyazaki |
| 2005/0049492 A1 | 3/2005 | Sweeny et al. |

(Continued)

*Primary Examiner* — Alexander Jamal
(74) *Attorney, Agent, or Firm* — Akerman LLP; Peter A. Chiabotti; Mammen (Roy) P. Zachariah, Jr.

(57) ABSTRACT

At least one exemplary embodiment is directed to a communication device that includes a microphone configured to detect an acoustic signal from an acoustic environment, and a processor, configured to detect an acoustical dampening between the acoustic environment and the microphone, based on a change in a characteristic of the acoustic signal and, responsive to the acoustical dampening, apply a compensation filter to the acoustic signal to form a compensated acoustic signal that is reproduced. Other embodiments are disclosed.

20 Claims, 10 Drawing Sheets

(56) References Cited

U.S. PATENT DOCUMENTS

| | | |
|---|---|---|
| 2005/0123143 A1 | 6/2005 | Platzer et al. |
| 2006/0045294 A1* | 3/2006 | Smyth .................... H04S 7/304 |
| | | 381/309 |
| 2006/0158956 A1 | 7/2006 | Laugham et al. |
| 2006/0161282 A1 | 7/2006 | Chung |
| 2007/0030986 A1 | 2/2007 | McArthur et al. |
| 2007/0237335 A1 | 10/2007 | O'Sullivan |
| 2008/0189397 A1 | 8/2008 | Atkinson et al. |
| 2008/0219456 A1 | 9/2008 | Goldstein et al. |
| 2009/0209304 A1* | 8/2009 | Ngia .................... H04R 1/1091 |
| | | 455/575.2 |
| 2014/0119553 A1 | 5/2014 | Usher et al. |

\* cited by examiner

ACOUSTIC DAMPENING COMPENSATION SYSTEM

CROSS-REFERENCE TO RELATED APPLICATIONS

This application is a continuation of U.S. patent application Ser. No. 14/109,987, filed on Dec. 18, 2013, which is a continuation of and claims priority to U.S. patent application Ser. No. 12/044,727, filed on Mar. 7, 2008, now U.S. Pat. No. 8,625,812, which claims priority to and the benefit of Provisional Application No. 60/893,617, filed on Mar. 7, 2007, all of which are hereby incorporated by reference in their entireties.

FIELD OF THE INVENTION

The present invention relates to acoustic signal manipulation, and more particularly, though not exclusively, to the acoustic compensation of acoustic dampening by headwear on detected acoustic signals.

BACKGROUND OF THE INVENTION

Some acoustic detecting and/or measuring devices (e.g., earpieces, room microphones), that measure ambient acoustic signals can be adversely affected when an acoustic dampening occurs between the source of an acoustic signal in an environment and the detecting and/or measuring device. The effect can be frequency dependent and can adversely effect the quality (e.g., spectral characteristics) of the measured acoustic signal.

SUMMARY OF THE INVENTION

In a first embodiment, a communication device includes a microphone configured to detect an acoustic signal from an acoustic environment, and a processor, configured to detect an acoustical dampening between the acoustic environment and the microphone, based on a change in a characteristic of the acoustic signal and, responsive to the acoustical dampening, apply a compensation filter to the acoustic signal to form a compensated acoustic signal that is reproduced. In one arrangement, the compensation filter can approximate an inverse of the acoustical dampening between the acoustic environment and the microphone. The microphone can be operatively and communicatively coupled to headwear, where the processor, responsive to an analysis of the change in the characteristic of the acoustic signal, can detect a presence of the headwear. The processor, from the analysis, can detect when the headwear is worn or removed, and apply the compensation filter to accommodate the headwear based on the presence of the headwear.

The processor can selectively adjust the spatial sensitivity of the headwear to sound in the user's local environment. The headwear can be one of a headset, earbud, earpiece or combination thereof. And, the processor actively detects when headwear is adjusted or fitted; it can be activated on a continuous or intermittent basis. In one arrangement, the compensation filter for the headwear can be activated via voice-activation. As an example, the processor detects an onset of the acoustical dampening from a first acoustic signal and responsive to the detected onset of the acoustical dampening applies the compensation filter. The communication device can be a portion of one of a computer system, a personal digital assistant, a cellular phone, a mobile phone, an earpiece or a head-worn communication device.

In a second embodiment, a method of compensating for acoustical dampening includes the steps of detecting an acoustic signal from an acoustic environment via a microphone, and detecting an acoustical dampening between the acoustic environment and the microphone based on a change in a characteristic of the acoustic signal, and, responsive to the acoustical dampening, filtering the acoustic signal using a compensation filter approximating an inverse of the acoustical dampening between the acoustic environment and the microphone. The microphone can be operatively coupled to headwear, and the processor, responsive to the change in the characteristic of the acoustic signal, detects a presence of the headwear. The headwear can be worn or removed, and apply the compensation filter to accommodate the headwear based on the presence of the headwear.

The processor can apply the compensation filter to selectively adjust a spatial sensitivity of the headwear to sound in the acoustic environment. The headwear can be one of a headset, earbud, earpiece or combination thereof. The processor can actively detect when headwear is adjusted or fitted; it can be activated on a continuous or intermittent basis. In one configuration, the compensation filter for the headwear can be activated via voice-activation. The processor can detect an onset of the acoustical dampening from a first acoustic signal and responsive to the detected onset of the acoustical dampening apply the compensation filter. The communication device can be a portion of one of a computer system, a personal digital assistant, a cellular phone, a mobile phone, an earpiece or a head-worn communication device.

BRIEF DESCRIPTION OF THE DRAWINGS

Exemplary embodiments of present invention will become more fully understood from the detailed description and the accompanying drawings, wherein.

DETAILED DESCRIPTION OF EXEMPLARY EMBODIMENTS OF THE PRESENT INVENTION

Figure 1A:
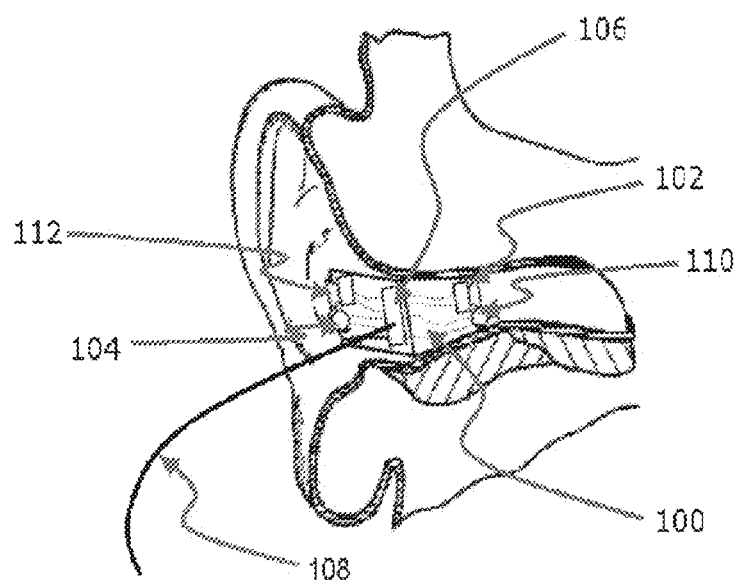
FIG. 1A illustrates one example of an acoustic dampening compensation device.

The following description of exemplary embodiment(s) is merely illustrative in nature and is in no way intended to limit the invention, its application, or uses.

Exemplary embodiments are directed to or can be operatively used on various wired or wireless earpieces devices (e.g., earbuds, headphones, ear terminals, behind the ear devices or other acoustic devices as known by one of ordinary skill, and equivalents).

Processes, techniques, apparatus, and materials as known by one of ordinary skill in the art may not be discussed in detail but are intended to be part of the enabling description where appropriate. For example specific computer code may not be listed for achieving each of the steps discussed, however one of ordinary skill would be able, without undo experimentation, to write such code given the enabling disclosure herein. Such code is intended to fall within the scope of at least one exemplary embodiment.

Additionally exemplary embodiments are not limited to earpieces, for example some functionality can be implemented on other systems with speakers and/or microphones for example computer systems, PDAs, BlackBerry® smartphones, cell and mobile phones, and any other device that emits or measures acoustic energy. Additionally, exemplary embodiments can be used with digital and non-digital acoustic systems. Additionally various receivers and microphones can be used, for example MEMs transducers, diaphragm transducers, for example Knowles' FG and EG series transducers.

Notice that similar reference numerals and letters refer to similar items in the following figures, and thus once an item is defined in one figure, it may not be discussed or further defined in the following figures.

At least one exemplary embodiment of the present invention is illustrated in FIG. 1A. The embodiment is a small headphone that is inserted in the ear of the user. The headphone consists of the sound-attenuating earplug 100 inserted into the ear. At the inner (eardrum-facing) surface of the earplug 100, an ear-canal loudspeaker receiver 102 is located for delivering an audio signal to the listener. At the outer (environment-facing) surface of the earplug 100, an ambient-sound microphone 104 is located. Both the loudspeaker 102 and the microphone 104 are connected to the electronic signal processing unit 106. The signal processing unit 106 also has a connector 108 for input of the audio signal. Additionally, an ear-canal microphone 110 is placed at the inner (eardrum-facing) surface of the earplug 100 and an external loudspeaker 112 is placed on the outer (environment-facing) surface of the earplug 100 for performing other functions of the headphone system not described here (such as monitoring of sound exposure and ear health conditions, headphone equalization, headphone fit testing, noise reduction, and customization).

Figure 1B:
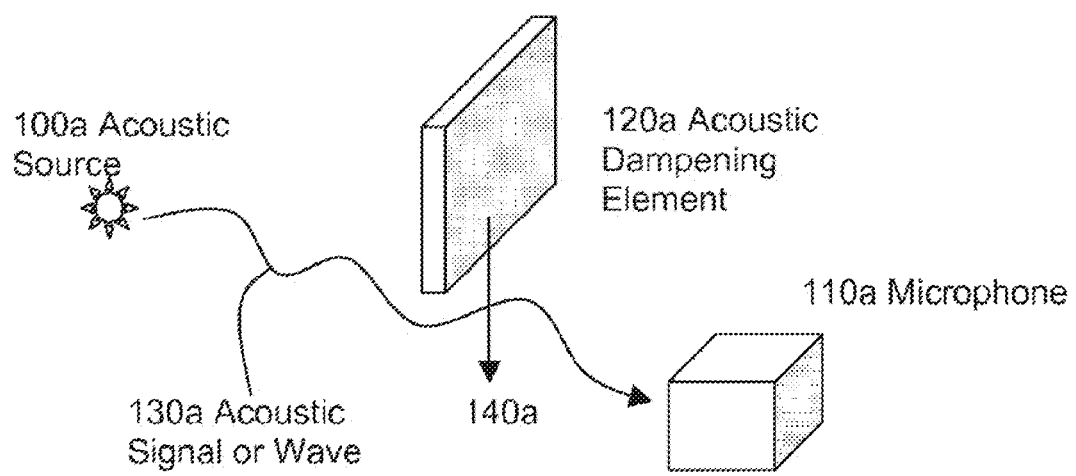
FIG. 1B illustrates one example of a situation of an acoustic dampening element affecting an acoustic signal.

FIG. 1B illustrates an example of an acoustic dampening element 120a, moving 140a into the path of an acoustic signal or wave 130a generated by an acoustic source 100a in ambient environment. The acoustic signal or wave 130a can be acoustically damped to some level by acoustic damping element 120a, so that the acoustic signal measured by the microphone 110a is effected.

Figure 2A:
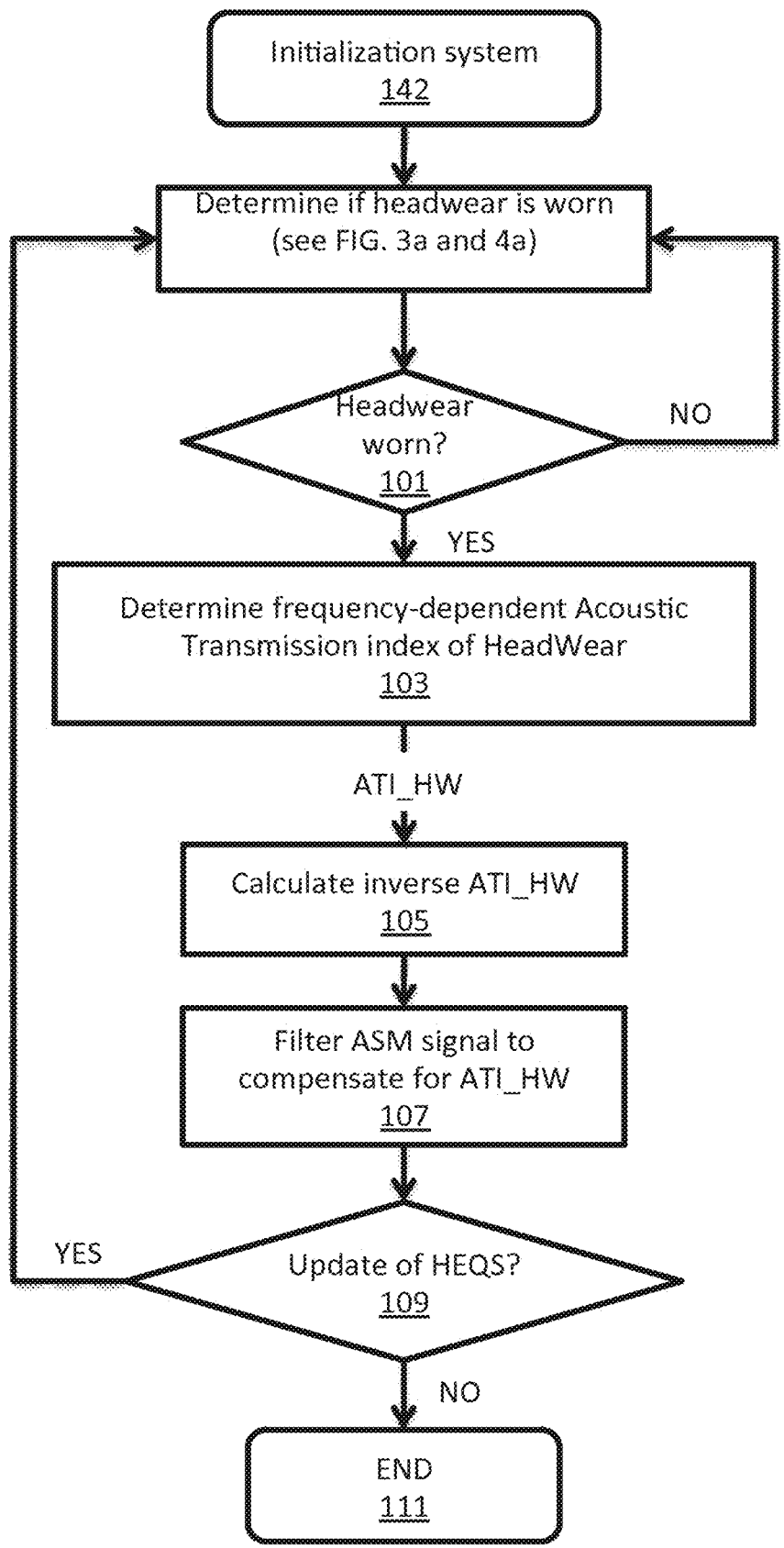
FIG. 2A is a flow chart of an acoustic compensation system according to at least one exemplary embodiment.

FIG. 2a depicts a general "top-level" overview of the Headwear acoustic Equalization System (HEQS). Initialization of the HEQS 142 may be manually invoked in a number of ways. One way is a manual activation; by either the HEQS user (i.e. that person wearing the headset system in FIG. 1A), or manually by a second person in a local or remote location (e.g. a supervisor). Another activation method is with an automatic mode, for instance in response to a loud sound or when the user dons headwear (e.g. a helmet). There are a number of methods for detecting headwear, as disclosed by the systems in FIGS. 3a and 4a. When headwear detection systems determine that headwear is worn, then decision unit 101 invokes a system 103 to determine the frequency dependent acoustic transmission index of the headwear (ATI_HW). An inverse of ATI_HW (inverse ATI_HW) 105 is calculated. The method for determining ATI_HW is described in FIGS. 5a and 5b. The ASM signal is then filtered 107 with a filter with a response approximating the inverse ATI_HW 105. This gives a modified ASM signal which approximates that the ASM signal with the headwear removed. The filter system 107 may use entirely analog circuitry or may use digital signal processing, e.g. using an FIR-type digital filter. Depending on the particular operating mode of the HEQS the ATI_HW may be updated on a continuous or intermittent basis, as determined by decision unit 109. If the operating mode is such that ATI_HW is calculated just once, then the update sequence is terminated 111.

Figure 2B:
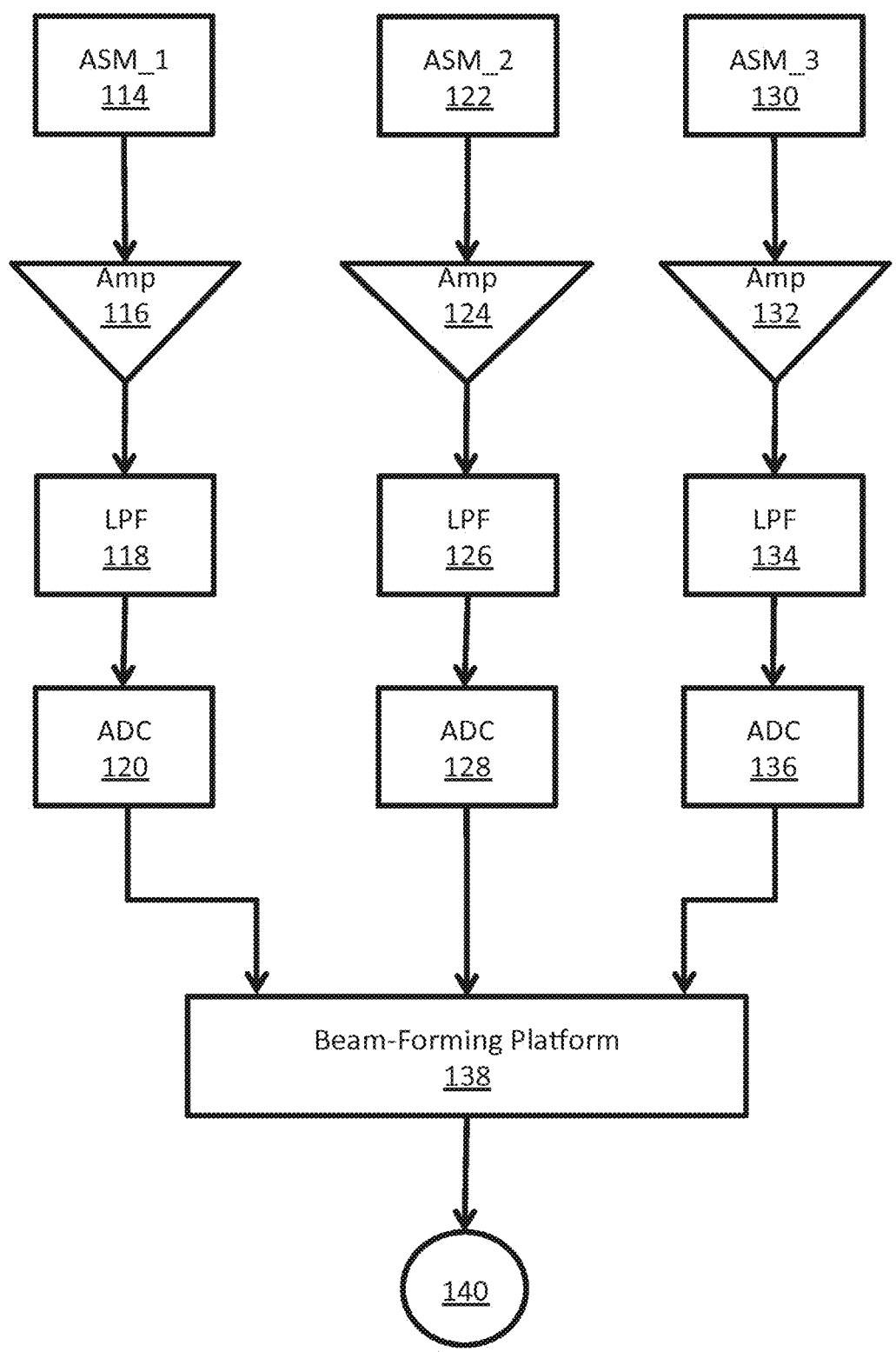
FIG. 2B is a block diagram of a microphone signal conditioner.

FIG. 2b describes an optional beam-forming platform 138. The beam forming platform 138 allows for the direction-dependent sensitivity of the microphones in the headset in FIG. 1 to be electronically manipulated. For instance, the sensitivity may be increased in the direction of the HEQS user's voice, and decreased in the direction of local noise sources, such as machine noise. The beam-forming platform 138 takes as its inputs at least three Ambient Sound Microphones (ASMs) 114, 122, 130. The analog signal is then amplified (amp) 116, 124, 132, and then filtered with a Low Pass Filter (LPF) 118, 126, 134 to prevent frequency aliasing by the Analog to Digital Converters (ADC) 120, 128, 136. The beam-forming platform 138 may also take as its input signal the output signal from ASMs in both the left and right headsets worn by the HEQS user. The output signal 140 for each headset is considered the "conditioned ASM signal" in other figures in the present invention.

Figure 3A:
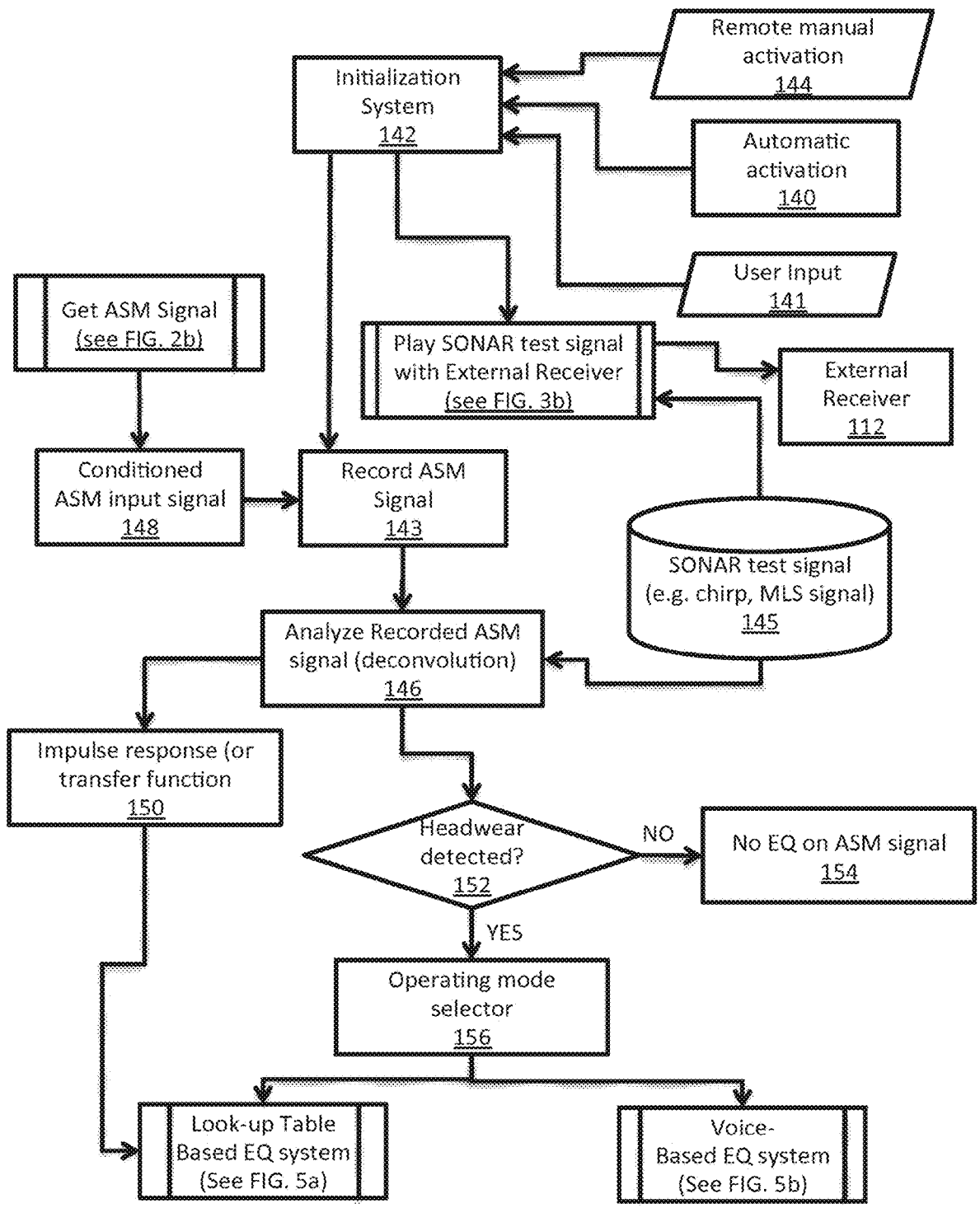
FIG. 3A illustrates at least one method of detecting whether an acoustic dampening event occurs in accordance with at least one exemplary embodiment.

FIG. 3a depicts the SONAR-based headwear detection platform. This system detects the presence of headwear using a SONAR-based system. Activation of this system 142 may be manually by a remote second person 144 or by the HEQS user 141, or may be automatic 140 e.g. with a computer timer. A SONAR test signal is reproduced with the External Receiver (ER) 112 whilst simultaneously recording 143 the conditioned ASM signal 148. The SONAR test signal 145 may be one of a number of specific test signals, as described in FIG. 3b. The recorded ASM signal 143 is analyzed 146 to extract the time-domain impulse response (IR) or frequency domain transfer function 150. The frequency-domain transfer function may be obtained empirically by dividing the spectral frequency profile of the SONAR test signal 145 by the spectral frequency profile of the recorded ASM signal 143 (if the spectral frequency profile is logarithmic, then this would be a subtraction of the two profiles). Alternatively, an adaptive filter such as one based on the LMS algorithm may be used to iteratively approximate the time-domain impulse response or frequency domain transfer function. If a maximum-length sequence (MLS) SONAR test signal is used, then the time-domain IR may be obtained by cross-correlation of the MLS and recorded ASM signal 143. The resulting IR is then analyzed to detect headwear. This is undertaken by detecting features in the IR representative of strong sound reflections at time delays consistent with headwear; for instance, if a helmet is worn, then a reflection from the brim is expected at about 0.6 ms for a brim that is 10 cm from the headset. If close-fitting headwear is worn, such as a balaclava or fire-proof hood, then a higher-level IR would be observed (especially at high frequencies) compared with the case when no headwear is worn. If no headwear is worn, then decision unit 152 determines that no additional filtering of the ASM signal is undertaken 154. However, if the analysis of the obtained IR 146 predicts that headwear is worn, then depending on the particular operating mode 156 (which may be set with the initialization system 142) filtering of the ASM signal may be invoked with either a look-up table based EQ system (FIG. 5*a*) or a voice-based EQ system (FIG. 5*b*).

Figure 3B:
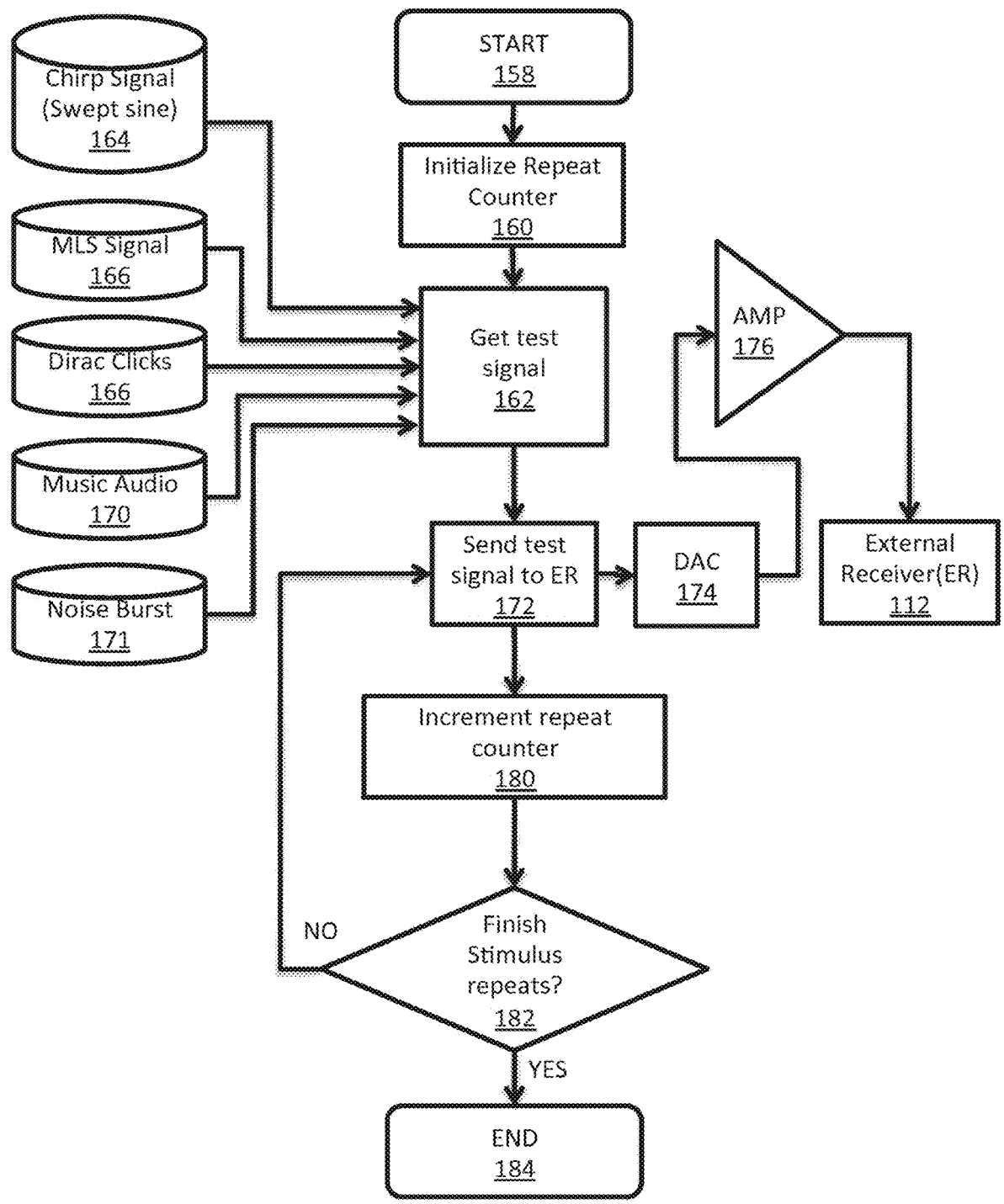
FIG. 3B illustrates at least one further method of detecting whether an acoustic dampening event occurs in accordance with at least one exemplary embodiment.
Figure 5A:
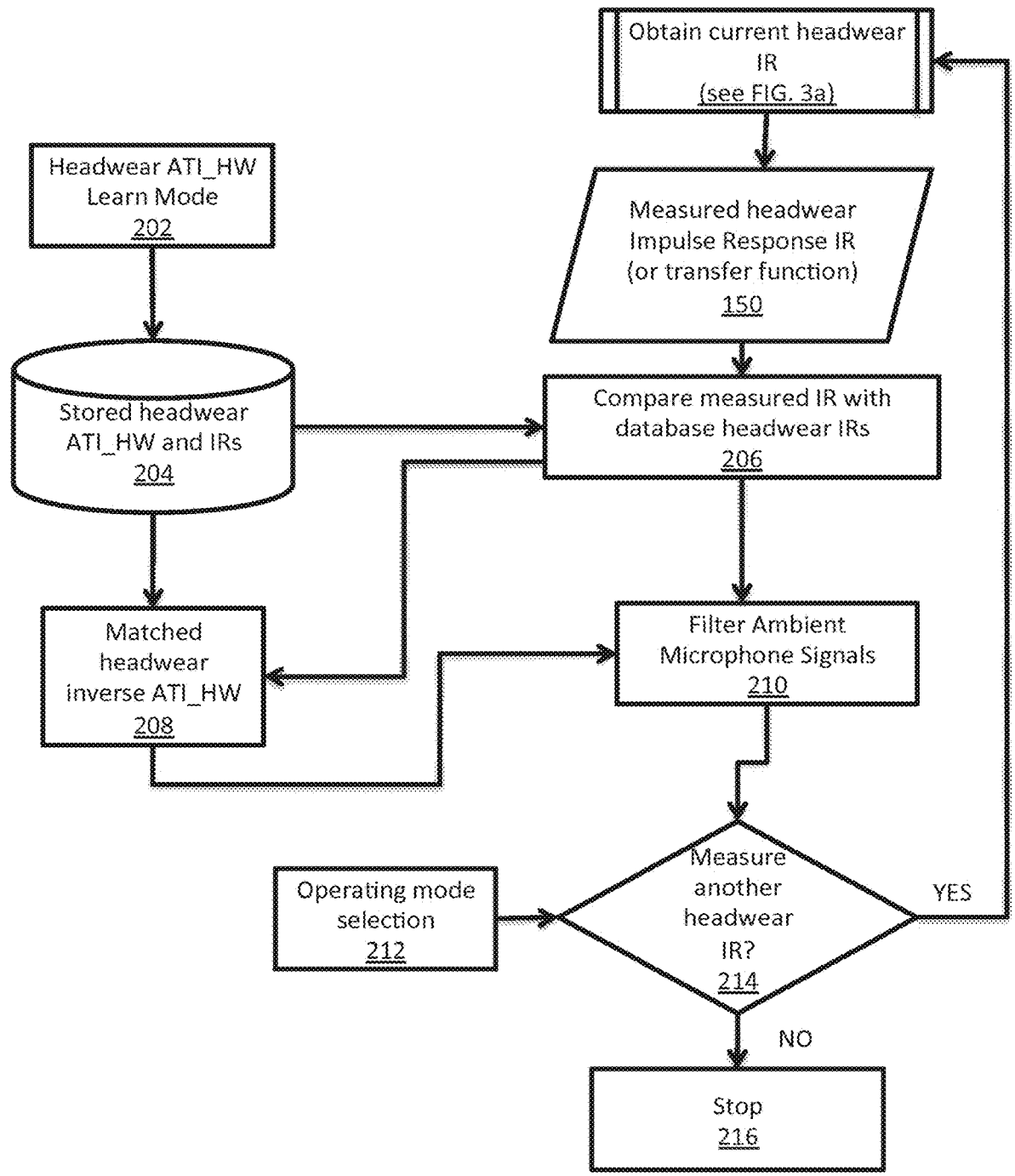
FIG. 5A illustrates a block diagram of a parameter look up system in accordance with at least one exemplary embodiment.
Figure 5B:
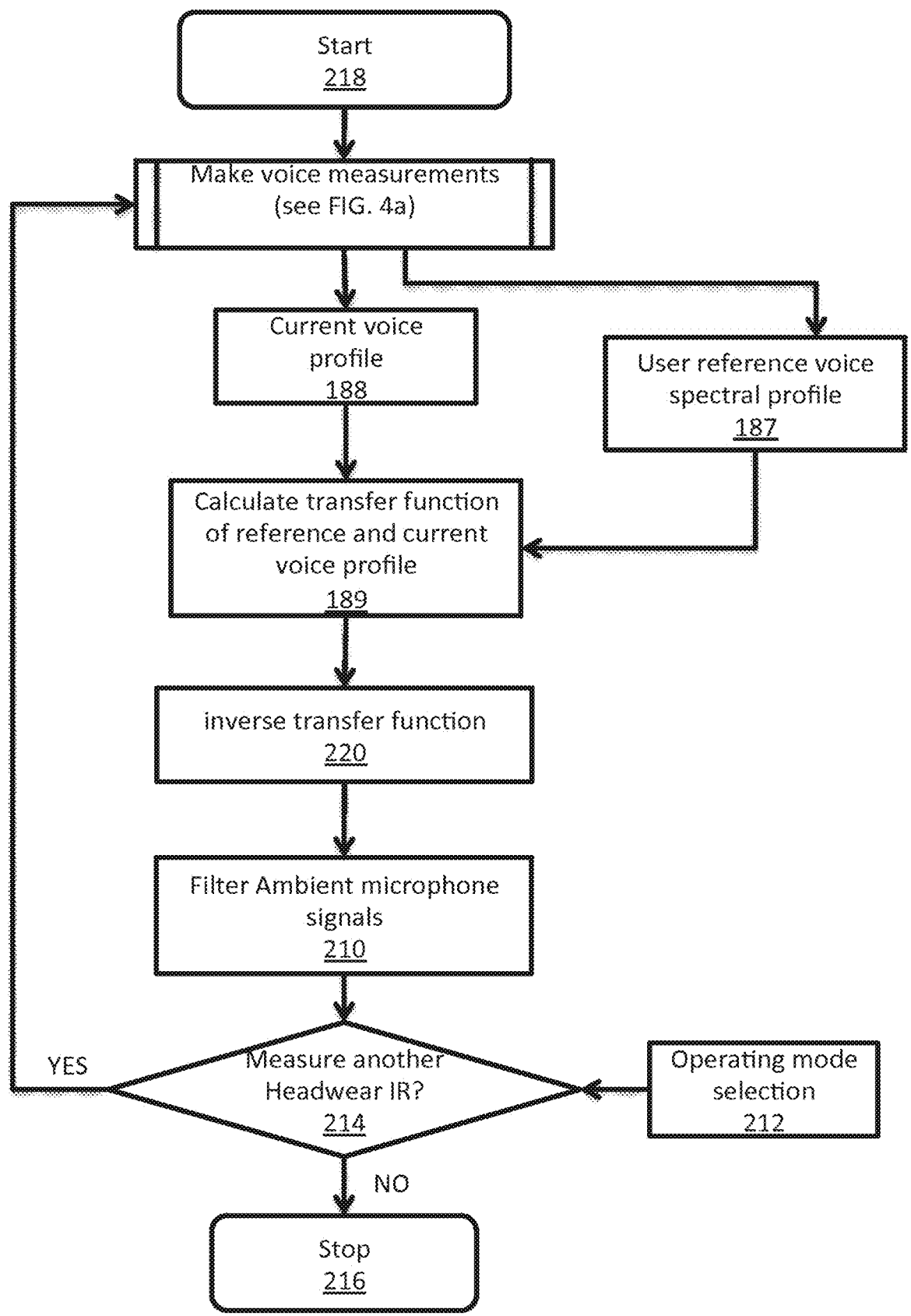
FIG. 5B illustrates a headwear equalization system in accordance with at least one exemplary embodiment.

FIG. 3*b* depicts the assembly for generating the SONAR test signal used by the SONAR-based headwear detection platform in FIG. 3*b*, and also for the system which determines the acoustic transmission index of the headwear described in FIG. 5*a*. When the SONAR test signal is needed, the activation command 158 initializes a counter 160 which keeps a record of the number of repetitions of the test stimulus (i.e. how many averages the analysis system makes). The particular test signal used may be one of a number of signals; a frequency sweep 164 (ideally this so-called chirp signal is from a lower frequency to a higher frequency with a logarithmic rather than linear incremental sweep). Single or multi-frequency sine-waves may also be used to give a frequency-dependent acoustic transfer function. A Maximum Length Sequence (MLS) signal 166 is often used to measure acoustic impulse responses. Transient (Dirac) impulses 168 give a IR directly. Music audio 170 may be used to measure the transfer function, as well as noise bursts 171 which may be narrow-band filtered. Once the audio test signal is acquired 162, the signal is sent 172 to the external receiver (ER) 112 via digital to analog conversion (DAC) 174 and analog amplification (amp) 176 (which may be frequency-dependent to compensate for the electroacoustic sensitivity of the loudspeaker). A digital counter 180 tracks the number of times the audio test signal is repeatedly reproduced with the ER, and decision unit 182 terminates reproduction of the test signal 184 when the number of repeats is sufficient.

Figure 4A:
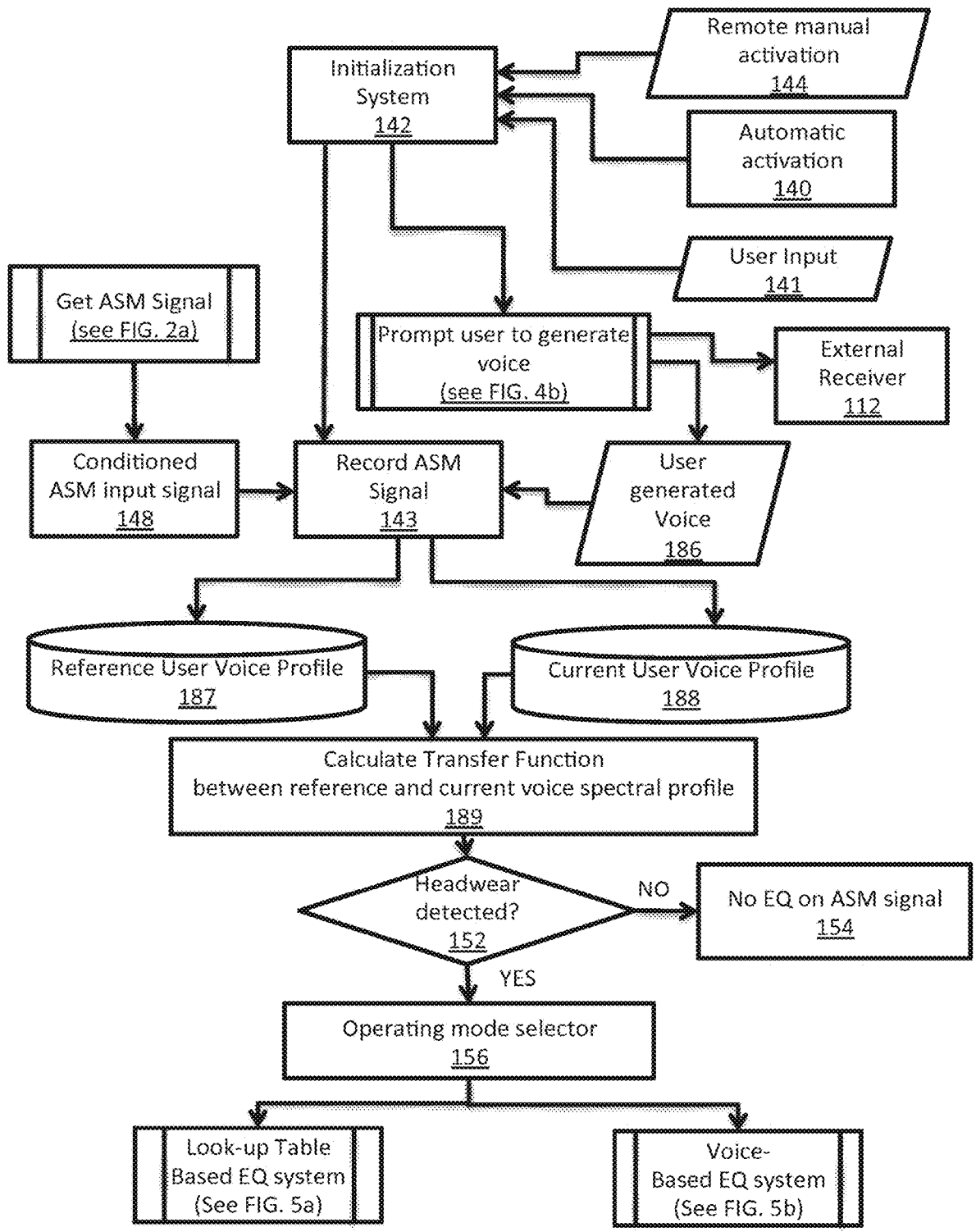
FIG. 4A illustrates at least one further method of detecting whether an acoustic dampening event occurs in accordance with at least one exemplary embodiment.

Alternative to the SONAR-based system in FIG. 3*a* is the Voice-based headwear detection platform described in FIG. 4*a*. This system detects the presence of headwear using a user-generated voice. Activation of this system 142 may be manually by a remote second person 144 or by the HEQS user 141, or may be automatic 140 e.g. with a computer timer. The headwear is detected by analyzing the conditioned ASM signal 148 in response to user-generated voice 186. The prompting system for the user to speak is described in FIG. 4*b*. The recorded ASM signal is analyzed by unit 143 when there is no headwear present to give a reference user voice spectral profile 187. When the user dons headwear, they are prompted to speak (see FIG. 4*b*) and a second ASM recording is made to give a current user voice spectral profile 188. The reference user voice spectral profile 187 and current user voice spectral profile 188 are compared with unit 189 to give a transfer function which is analyzed to predict if headwear is worn. This analysis system may, for instance, determine that headwear is worn if the transfer function indicates that high-frequency content (e.g. at particular frequencies such as 1 kHz and 4 kHz) are attenuated in the current user voice spectral profile 188 compared with the reference user voice spectral profile 187 (e.g. are <5 dB at these particular frequencies). If this analysis unit 189 determines that headwear is not worn, then decision unit 152 does not filter the ASM signal 154. Alternately, if analysis unit 189 determines that headwear IS worn, then decision unit 152 further determines the frequency dependent acoustic transmission index of the headwear (ATI_HW) that is used to filter the ASM signal (i.e. with a filter response approximating the inverse of ATI_HW). ATI_HW is calculated depending on the particular operating mode, as determined by unit 156. These two operating modes are described in FIG. 5*a* and FIG. 5*b*.

Figure 4B:
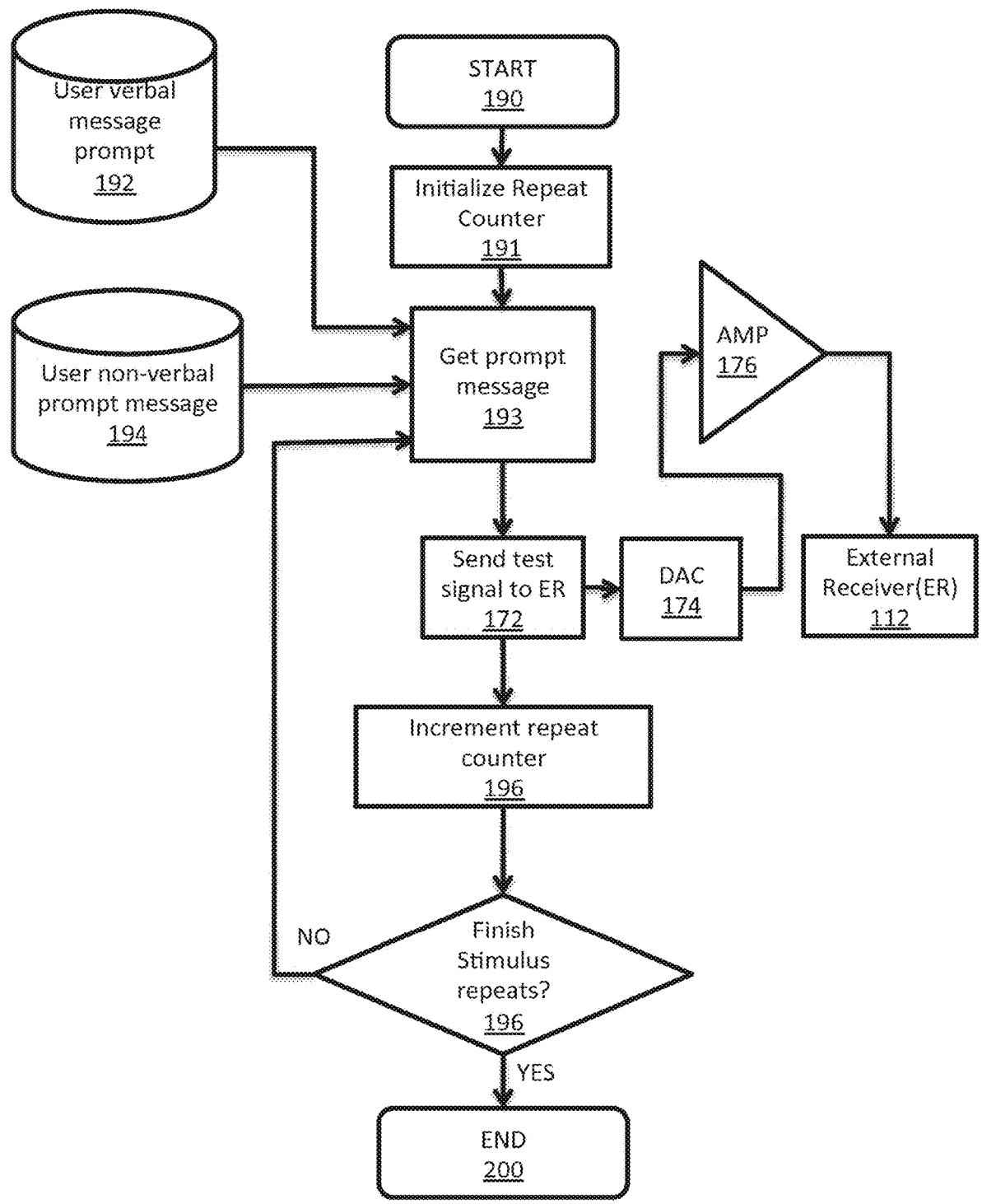
FIG. 4B illustrates a user voice spectral profile acquisition system in accordance with at least one exemplary embodiment.

FIG. 4*b* describes the user-prompting system for the voice-based headwear detection platform. Activation command 190 initializes a counter 191 which keeps a record of the number of repetitions of the test stimulus. Either a pre-recorded verbal message 192 or non-verbal message 194 (e.g. a tone) is acquired 193 as a prompt message. The prompt message sent 172 to external receiver 112 (after digital to analog conversion 174 and analog amplification 176) and is reproduced with the External Receiver 112 for the user to speak either a specific set of words (e.g. a phonetically balanced word list) or general words (e.g. normal conversation) or non-speech sounds (such as a whistle or hand-clap). This prompt may be repeated a number of times, according to the incremental repeat counter 196 and decision unit 198 which terminates 200 the prompt message after a pre-defined number of repeated message prompts.

FIG. 5*a* describes a system for determining the acoustic transmission index of the headwear (ATI_HW). This is a frequency dependent value for the free-field acoustic absorption of the headwear from an external sound source to a measurement point on the other side of the headwear (specifically, measured at the entrance to the user's ear canal). The system uses the SONAR headwear detection platform described in FIG. 3*a* to obtain a headwear impulse response 150. It should be noted that this is not the same as the ATI_HW; rather, it is the impulse response obtained by emitting a SONAR test signal from the external receiver (112 in FIG. 1) and recording the sound response at the ASM 104 (or conditioned ASM signal 140 in FIG. 2*b*). In a particular optional learn mode 202, the IR of different headwear may be measured empirically, and their corresponding ATI_HW is also measured and stored in computer memory 204. The recently measured headwear IR 150 is then compared and matched with measured IRs in the database 204 using matching unit 206 (matching may be accomplished using a standard least mean squares difference approach). When the current headwear has been matched to one in the database, then the ASM signal 140 is filtered with an impulse response (or frequency-domain transfer function) which approximates the inverse of the matched ATI_HW 208. The filtering of the ASM signal by unit 210 may be accomplished using a digital FIR-type filter or an IIR-type digital filter, or a multi-band analog audio signal filter. Depending on the particular operating mode of the HEQS selected by the user (or automatically selected) with selecting device 212, the ATI_HW may be continually updated by decision unit 214. The process may be terminated at step 216.

FIG. 5*b* describes an alternative method to that system in FIG. 5*a*, for determining the ATI_HW of the headwear worn by the HEQS user. The method in FIG. 5*b* begins at step 218 and uses a measure of the user's reference voice spectral profile 187. This is a spectral profile of the (conditioned) ASM signals when no headwear is worn in response to user-generated speech or non-speech (e.g. hand-claps). This is compared to the current ASM spectral profile 188 when the user is wearing headwear. The comparison is undertaken by unit 189, which may be a simple spectral subtraction (in the logarithmic or decibel domain), or may be a division of the linear spectral magnitude. The resulting transfer function approximates ATI_HW, and its inverse is calculated by unit 5 to give a data vector which can be used to filter the ASM signals with filter unit 210 (as previously described for FIG. 5a). The process may be terminated at step 216.

Figure 6:
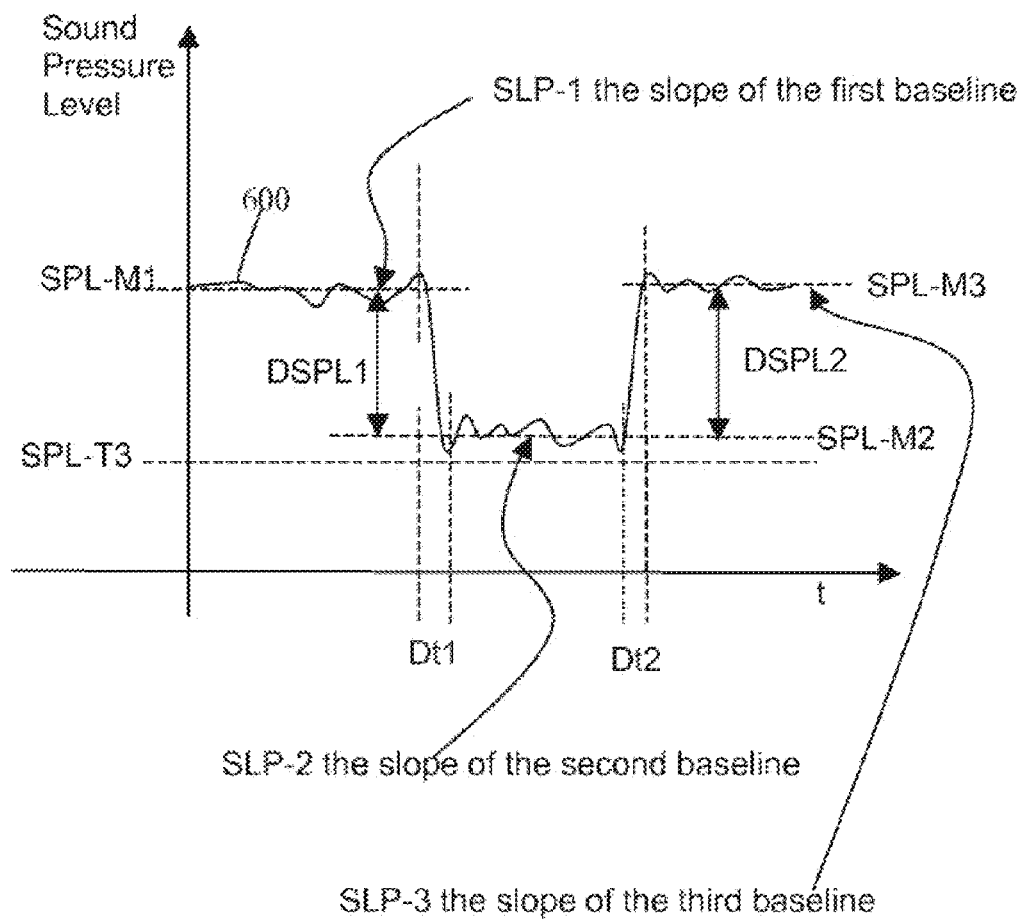
FIG. 6 illustrates an example of detecting a drop in sound pressure levels using the rate of change, mean values, slopes and other parameters in accordance with at least one exemplary embodiment.

FIG. 6 illustrates an acoustic signal 600 displayed in a non-limiting manner as the sound pressure level versus time, t. In this non-limiting example acoustic signal 600 is broken into three regions. The first region can be characterized by an average value SPL-M1, with an associated baseline (e.g., a line fit utilizing least squares) having a slope SLP-1. Similarly the second and third regions can be characterized by an average value SPL-M2 and SPL-M3 respectively, with an associated baseline (e.g., a line fit utilizing least squares) having slopes SLP-2 and SLP-3 respectively. FIG. 6 illustrates the situation where a microphone (throughout the duration) is measuring the acoustic signal 600, the measurement plotted in FIG. 6. At the onset of an acoustic dampening event (e.g., sheet placed on microphone, headwear placed over earpiece microphone) the measured Sound Pressure Level (SPL) value decreases from SPL-M1 to SPL-M2 over a period of time Dt1. The rate of decrease, [(SPL-M2)−(SPL-M1)]/Dt1=R1, can be compared to a threshold value T1 to aid in determining if an acoustic dampening event has occurred. For example if R1=20 dB/1 sec, and T1=10 dB/sec, and the criteria for an acoustic dampening effect (e.g., rather than an acoustic source shut off) is |R1|<T1, then if |R1|<T1 (note that a criteria R1>T1 can also be used as well as an equality relationship) as it is in the example can be used as an indication of an acoustic dampening event rather than an acoustic source shut off. Note that in the example illustrated in FIG. 6, the acoustic dampening event is removed resulting in an increase from SPL-M2 to SPL-M3 in time Dt2. The rate of change, R2=[(SPL-M3)−(SPL-M2)]/Dt2, can be compared with a threshold T2 in a similar manner as described above for T1. Another threshold that can be used is the dropped sound pressure levels (DSPL1, DSPL2) average baseline value, for example if SPL-M2>SPL-T3 then this can be used as an indication that an acoustic dampening event has occurred rather than an acoustic source shut off. For example if the threshold value SPL-T3 is effective quiet (e.g., 80 dB) then if SPL-M2 drops to below SPL-T3 then this can be indicative of an acoustic source being turned off.

Other criteria can also be used as indicators of an acoustic dampening event occurring. For example if the slopes of the baselines before and after shifting are significantly different this can be indicative of an acoustic source shut off rather than an acoustic dampening event. For example if |SLP-2−SLP-1|>|(SLP-1/2)|, this could be indicative that an acoustic source has been turned off and that possibly the slope of the second baseline (SLP-2) is close to zero.

FURTHER EXEMPLARY EMBODIMENTS

The following paragraphs list various other exemplary embodiments of the invention. The list is meant as illustrative only not as a limitative list of embodiments.

A self-contained Headwear Acoustic Equalization system (HEQS) to compensate for the acoustic filtering of headwear (hats, helmets, fire-proof headwear etc.) is herein described. The Headwear Acoustic Equalization System (HEQS) empirically measures or determines the acoustic filtering properties of a head garment on a continuous, intermittent, or discrete basis. The acoustic filtering properties are used to compensate for the change in response of a microphone mounted on the user's head (e.g. at or near the entrance to the ear canals) from an external sound source (e.g. voice) by filtering the microphone signal with an audio signal filter (which may be adaptive or one from a pre-defined filter database). The HEQS comprises:

A. An assembly to monitor the acoustic field in a user's immediate environment using one or more Ambient Sound Microphones (ASMs) located near to or at the entrance to one or both occluded ear canals.

B. A signal processing circuit to amplify the signals from the ASMs in (A) and to equalize for the frequency sensitivity of the microphones and to low-pass filter (LPF) the signals prior to digital conversion to prevent aliasing (with the cut-off frequency of the LPF equal or less than half the sampling frequency of the digital sampling system).

C. An analog-to-digital converter (ADC) to convert the filtered analog signals in (B) to a digital representation.

D. An optional beam-forming platform that takes as its inputs the digital signals from the ASMs from one or both headsets to selectively affect the spatial sensitivity of the headset to sound in the user's local environment.

E. An assembly to generate a desired SPL at or near the entrance to one or both occluded (or partly occluded) ear canals consisting of a loudspeaker receiver mounted in an earplug that forms an acoustic seal of the ear canal. (This is the External Receiver; ER).

F. A signal processing circuit to amplify the signal to the ER to equalize for the frequency sensitivity of the transducer.

G. A digital-to-analog converter (DAC) to convert a digital audio signal into an analog audio signal for reproduction with the ER.

H. A HEQS initialization system to start the HEQS; which may be manually initialized by the user with voice-activation or with a physical switch, or may include remote activation by a second person, or may be automatically activated by a system which detects when headwear is adjusted or fitted, or may be activated on a continuous or intermittent basis.

I. A system to detect whether the HEQS user is wearing headwear. Examples of headwear include: a military helmet, a SWAT hood, balaclava, cold-weather face mask, helmet liner, neoprene camouflage face mask, religious headwear such as a burka or turban, or a fireproof face mask as typically worn by fighter pilots and fire-service workers (fire men/women).

J. A system to determine the frequency-dependent acoustic attenuation of the headwear from an ambient sound source (such as the user's voice or a sound-creating object in the environment of the user) to the ASM(s). This attenuation transmission index is called ATI_HW.

K. A system to filter the ASM signal with the inverse of the ATI_HW of the headwear, so as to give an ASM signal similar to that with the headwear absent.

L. A system to update the ATI_HW automatically on a continuous basis.

M. A system to update the ATI_HW manually from either a user-generated command or a command issued by a second remote person.

N. A system to update the ATI_HW automatically on an intermittent basis (e.g. every 10 minutes).

O. A system to transmit the ATI_HW to a data storage or analysis system using a wired or wireless data transmission system.

Another embodiment of the invention enables the HEQS to automatically determine if headwear is worn using a self-contained SONAR-based headwear detection platform. A SONAR test sound is emitted with an external receiver mounted on the headset device, and its sound reflection is detected using one or more ambient sound microphones mounted on the same headset. The reflected sound is analyzed to determine the presence of headwear. This SONAR-based headwear detection platform comprises:

A. An assembly to monitor the acoustic field in a user's immediate environment using one or more Ambient Sound Microphones (ASMs) located near to or at the entrance to one or both occluded ear canals.

B. A signal processing circuit to amplify the signals from the ASMs in (A) and to equalize for the frequency sensitivity of the microphones and to low-pass filter (LPF) the signals prior to digital conversion to prevent aliasing (with the cut-off frequency of the LPF equal or less than half the sampling frequency of the digital sampling system).

C. An analog-to-digital converter (ADC) to convert the filtered analog signals in (B) to a digital representation.

D. An optional beam-forming platform that takes as its inputs the digital signals from the ASMs from one or both headsets to selectively affect the spatial sensitivity of the headset to sound in the user's local environment.

E. An assembly to generate a desired SPL at or near the entrance to one or both occluded (or partly occluded) ear canals consisting of a loudspeaker receiver mounted in an earplug that forms an acoustic seal of the ear canal. (This is the External Receiver; ER).

F. A signal processing circuit to amplify the signal to the ER to equalize for the frequency sensitivity of the transducer.

G. A digital-to-analog converter (DAC) to convert a digital audio signal into an analog audio signal for reproduction with the ER.

H. An initialization system to start the SONAR-based headwear detection platform; which may be manually activated by the user with voice-activation or with a physical switch, or may be remotely activated by a second person, or may be automatically activated by a system which detects when headwear is adjusted or fitted, or may be activated on a continuous or intermittent basis.

I. A system to generate or retrieve from computer memory a SONAR audio data test signal. This signal may be one of the following types:
  a. Swept sine "chirp" signal.
  b. Maximum Length Sequence (MLS) test signal.
  c. Dirac transient click signal.
  d. Music audio signal.
  e. Noise signal (white noise or pink noise).

J. Circuitry to reproduce the audio test signal in (I) with the external receiver.

K. A system to simultaneously record the ASM signal whilst the test signal in (I) is reproduced with the ER.

L. A system to repeat the reproduction of the test signal in (I).

M. A system to analyze the recorded ASM signal in response to the SONAR test signal to determine if headwear is worn. This system comprises a method to deconvolve the recorded ASM signal to give a time domain impulse response or frequency domain transfer function with reference to the original SONAR test audio signal.

N. A system to determine if headwear is worn by analysis of the deconvolved test impulse response (IR) or transfer function (TF) in (M) with respect to a reference IR or TF made with no headwear worn.

Another embodiment of the invention enables the HEQS to automatically determine the frequency-dependent acoustic absorption characteristics of the headwear worn by a user (this is the Headwear acoustic Attenuation Transmission Index or ATI_HW). Once obtained, the ASM signal is filtered with a filter corresponding to the inverse of ATI_HW. This self-contained SONAR-based headwear determination platform uses a SONAR test sound emitted with an external receiver mounted on the headset device, and its sound reflection is detected using one or more ambient sound microphones mounted on the same headset. The reflected sound is analyzed to determine the headwear using a look-up table analysis with previous measurements of known headwear. This SONAR-based headwear determination platform comprises:

A. An assembly to monitor the acoustic field in a user's immediate environment using one or more Ambient Sound Microphones (ASMs) located near to or at the entrance to one or both occluded ear canals.

B. A signal processing circuit to amplify the signals from the ASMs in (A) and to equalize for the frequency sensitivity of the microphones and to low-pass filter (LPF) the signals prior to digital conversion to prevent aliasing (with the cut-off frequency of the LPF equal or less than half the sampling frequency of the digital sampling system).

C. An analog-to-digital converter (ADC) to convert the filtered analog signals in (B) to a digital representation.

D. An optional beam-forming platform that takes as its inputs the digital signals from the ASMs from one or both headsets to selectively affect the spatial sensitivity of the headset to sound in the user's local environment.

E. An assembly to generate a desired SPL at or near the entrance to one or both occluded (or partly occluded) ear canals consisting of a loudspeaker receiver mounted in an earplug that forms an acoustic seal of the ear canal. (This is the External Receiver; ER).

F. A signal processing circuit to amplify the signal to the ER to equalize for the frequency sensitivity of the transducer.

G. A digital-to-analog converter (DAC) to convert a digital audio signal into an analog audio signal for reproduction with the ER.

H. An initialization system to start the SONAR-based headwear detection platform; which may be manually activated by the user with voice-activation or with a physical switch, or may be remotely activated by a second person, or may be automatically activated by a system which detects when headwear is adjusted or fitted, or may be activated on a continuous or intermittent basis.

I. A system to generate or retrieve from computer memory a SONAR audio data test signal. This signal may be one of the following types:
  a. Swept sine "chirp" signal.
  b. Maximum Length Sequence (MLS) test signal.
  c. Dirac transient click signal.
  d. Music audio signal.
  e. Noise signal (white noise or pink noise).

J. Circuitry to reproduce the audio test signal in (I) with the external receiver.

K. A system to simultaneously record the ASM signal whilst the test signal in (I) is reproduced with the ER.

L. A system to repeat the reproduction of the test signal in (I).
M. A system to analyze the recorded ASM signal in response to the SONAR test signal to determine if headwear is worn. This system comprises a method to deconvolve the recorded ASM signal to give a time domain impulse response or frequency domain transfer function with reference to the original SONAR test audio signal.
N. A system to determine if headwear is worn by analysis of the deconvolved test impulse response (IR) or transfer function (TF) in (M) with respect to a reference IR or TF made with no headwear worn.
O. A system to determine what headwear is worn by the user by comparing the empirically obtained IR or TR with a library of measured IRs or TRs previously obtained. The empirically obtained IR or TR is matched with the particular previously measured IR or TR using, for example, the method of least-squared difference.
P. A system to obtain the ATI_HW of the worn headwear using a look-up table of previously measured ATI_HW's corresponding to particular headwear IR's.
Q. A system to filter the ASM signal with a filter corresponding to the inverse of the obtained ATI_HW. In an exemplary embodiment, this filter is a digital FIR-type filter.

Another embodiment of the invention enables the HEQS to automatically determine if headwear is worn using a self-contained Voice-based headwear detection platform. A Voice test sound is generated by the HEQS user, and is simultaneously detected using one or more ambient sound microphones mounted on the same headset. In some embodiments the user-generated sound is a non-voice sound such as a hand-clap or mouth whistle. The measured sound is analyzed to determine the presence of headwear. This Voice-based headwear detection platform comprises:
  A. An assembly to monitor the acoustic field in a user's immediate environment using one or more Ambient Sound Microphones (ASMs) located near to or at the entrance to one or both occluded ear canals.
  B. A signal processing circuit to amplify the signals from the ASMs in (A) and to equalize for the frequency sensitivity of the microphones and to low-pass filter (LPF) the signals prior to digital conversion to prevent aliasing (with the cut-off frequency of the LPF equal or less than half the sampling frequency of the digital sampling system).
  C. An analog-to-digital converter (ADC) to convert the filtered analog signals in (B) to a digital representation.
  D. An optional beam-forming platform that takes as its inputs the digital signals from the ASMs from one or both headsets to selectively affect the spatial sensitivity of the headset to sound in the user's local environment.
  E. A digital-to-analog converter (DAC) to convert a digital audio signal into an analog audio signal for reproduction with the ER.
  F. An initialization system to start the Voice-based headwear detection platform; which may be manually activated by the user with voice-activation or with a physical switch, or may be remotely activated by a second person, or may be automatically activated by a system which detects when headwear is adjusted or fitted, or may be activated on a continuous or intermittent basis.
  G. A system to obtain a Reference User Voice Profile (rUVP); when activated by the system in (F), the rUVP acquisition system works by the user generating some general or predefined verbal messages (e.g. a collection of phonemically balanced words, prompted by a messaging system reproduced with the ear canal receiver). Alternatively, the user may be asked to generate non-verbal sound stimuli, such as hand claps or mouth-whistles. Whilst the user creates the Reference sound message, the ASM signals are simultaneously recorded. The resulting spectral profile is the rUVP.
  H. A system to obtain a Current User Voice Profile (cUVP); when activated by the system in (F), the cUVP acquisition system works by the user generating some general or predefined verbal messages (e.g. a collection of phonemically balanced words, prompted by a messaging system reproduced with the ear canal receiver). Alternatively, the user may be asked to generate non-verbal sound stimuli, such as hand claps or mouth-whistles. Whilst the user creates the Reference sound message, the ASM signals are simultaneously recorded. The resulting spectral profile is the cUVP.
  I. A system to compare the rUVP and cUVP, and thus determine if headwear is used. This comparison may be in the time domain, but in an exemplary embodiment the comparison is in the frequency domain. If the frequency content of the cUVP is less than the rUVP at particular frequencies (e.g. $\frac{1}{3}^{rd}$ octave measurements made at 1 kHz and 4 kHz) by a pre-defined amount (e.g. 5 dB), then it may be deemed that headwear is currently being worn.

Another embodiment of the invention enables the HEQS to automatically determine the frequency-dependent acoustic absorption characteristics of the headwear worn by a user (this is the Headwear acoustic Attenuation Transmission Index or ATI_HW). Once obtained, the ASM signal is filtered with a filter corresponding to the inverse of ATI_HW. This self-contained Voice-based headwear determination platform uses a Voice or non-voice (e.g. hand-clap) test sound created by the HEQS user, and is simultaneously recorded using one or more ambient sound microphones mounted on a headset near to or in the user's ear canal. The recorded sound is analyzed to determine the particular headwear and its corresponding ATI_HW using a look-up table analysis with previous measurements of known headwear. This Voice-based headwear determination platform comprises:
  A. An assembly to monitor the acoustic field in a user's immediate environment using one or more Ambient Sound Microphones (ASMs) located near to or at the entrance to one or both occluded ear canals.
  B. A signal processing circuit to amplify the signals from the ASMs in (A) and to equalize for the frequency sensitivity of the microphones and to low-pass filter (LPF) the signals prior to digital conversion to prevent aliasing (with the cut-off frequency of the LPF equal or less than half the sampling frequency of the digital sampling system).
  C. An analog-to-digital converter (ADC) to convert the filtered analog signals in (B) to a digital representation.
  D. An optional beam-forming platform that takes as its inputs the digital signals from the ASMs from one or both headsets to selectively affect the spatial sensitivity of the headset to sound in the user's local environment.
  E. A digital-to-analog converter (DAC) to convert a digital audio signal into an analog audio signal for reproduction with the ER.
  F. An initialization system to start the Voice-based headwear detection platform; which may be manually activated by the user with voice-activation or with a physical switch, or may be remotely activated by a second person, or may be automatically activated by a system which detects when headwear is adjusted or fitted, or may be activated on a continuous or intermittent basis.

G. A system to obtain a Reference User Voice Profile (rUVP); when activated by the system in (F), the rUVP acquisition system works by the user generating some general or predefined verbal messages (e.g. a collection of phonemically balanced words, prompted by a messaging system reproduced with the ear canal receiver). Alternatively, the user may be asked to generate non-verbal sound stimuli, such as hand claps or mouth-whistles. Whilst the user creates the Reference sound message, the ASM signals are simultaneously recorded. The resulting spectral profile is the rUVP.

H. A system to obtain a Current User Voice Profile (cUVP); when activated by the system in (F), the cUVP acquisition system works by the user generating some general or predefined verbal messages (e.g. a collection of phonemically balanced words, prompted by a messaging system reproduced with the ear canal receiver). Alternatively, the user may be asked to generate non-verbal sound stimuli, such as hand claps or mouth-whistles. Whilst the user creates the Reference sound message, the ASM signals are simultaneously recorded. The resulting spectral profile is the cUVP.

I. A system to compare the rUVP and cUVP, and to determine the particular headwear worn by the user. This comparison may be in the time domain, but in an exemplary embodiment the comparison is in the frequency domain. If the frequency content of the cUVP is less than the rUVP at particular frequencies (e.g. $\frac{1}{3}^{rd}$ octave measurements made at 1 kHz and 4 kHz) by a pre-defined amount (e.g. 5 dB), then it may be deemed that headwear is currently being worn. The transfer function of rUVP to cUVP is compared to a database of measurements made with particular headwear with a known Headwear acoustic Attenuation Transmission Index or ATI_HW.

Alternative to the ATI_HW determination system in (I), a system to empirically to determine ATI_HW which is calculated as the ratio of rUVP to cUVP.

J. A system to filter the ASM signal with a filter corresponding to the inverse of the obtained ATI_HW (i.e. obtained in process I or J). In the at least one exemplary embodiment, this filter is a digital FIR-type filter.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions of the relevant exemplary embodiments. Thus, the description of the invention is merely exemplary in nature and, thus, variations that do not depart from the gist of the invention are intended to be within the scope of the exemplary embodiments of the present invention. Such variations are not to be regarded as a departure from the spirit and scope of the present invention.

What is claimed is:

1. A device, comprising:
   a processor that performs operations, the operations comprising:
   detecting, based on a change in a characteristic of an acoustic signal occurring in an acoustic environment, an acoustical dampening of the acoustic signal between the acoustic environment and a microphone, wherein the acoustical dampening of the acoustic signal results in a damped acoustic signal, wherein the acoustical dampening is facilitated by an acoustic dampening element in a path between the acoustic environment and the microphone of the device; and
   applying a compensation filter to the damped acoustic signal to form a compensated acoustic signal that is reproduced.

2. The device of claim 1, wherein the operations further comprise approximating, by utilizing the compensation filter, an inverse of the acoustical dampening between the acoustic environment and the microphone.

3. The device of claim 1, wherein the operations further comprise detecting a presence of headwear communicatively coupled to the microphone.

4. The device of claim 3, wherein the operations further comprise detecting the presence of the headwear based on an analysis of the change in the characteristic of the acoustic signal.

5. The device of claim 1, wherein the operations further comprise determining an acoustic transmission index of headwear communicatively coupled to the microphone.

6. The device of claim 1, wherein the operations further comprise obtaining an impulse response from headwear communicatively coupled to the microphone, wherein the impulse response is generated in response to a test signal emitted from a receiver of the device.

7. The device of claim 6, wherein the operations further comprise comparing the impulse response with measured impulse responses stored in a database to match the impulse response with at least one of the impulse responses stored in the database.

8. The device of claim 1, wherein the operations further comprise applying the compensation filter based on a transfer function between the damped acoustic signal and a reference signal.

9. The device of claim 8, wherein the operations further comprise determining that headwear is worn if the transfer function indicates that high-frequency content is attenuated in a voice spectral profile.

10. The device of claim 1, wherein the operations further comprise not applying the compensation filter if headwear communicatively coupled to the microphone is determined to not be worn.

11. The device of claim 1, wherein the operations further comprise predicting if headwear communicatively coupled to the microphone is worn.

12. The device of claim 1, wherein the operations further comprise detecting when headwear coupled to the device is adjusted.

13. A method, comprising:
   detecting, by utilizing a processor and based on a change in a characteristic of an acoustic signal occurring in an acoustic environment, an acoustical dampening of the acoustic signal between the acoustic environment and a microphone of a device, wherein the acoustical dampening of the acoustic signal results in a damped acoustic signal, wherein the acoustical dampening is facilitated by an acoustic dampening element in a path between the acoustic environment and the microphone of the device; and
   applying, by utilizing the processor, a compensation filter to the damped acoustic signal to form a compensated acoustic signal that is reproduced.

14. The method of claim 13, further comprising detecting an onset of the acoustical dampening.

15. The method of claim 14, further comprising applying the compensation filter in response to the onset of the acoustical dampening.

16. The method of claim 13, further comprising updating an acoustic transmission index of headwear communicatively coupled to the microphone continuously or intermittently.

17. The method of claim 16, further comprising terminating the updating if the acoustic transmission index is calculated once.

18. The method of claim 13, further comprising emitting a test signal from a receiver associated with the device.

19. The method of claim 18, further comprising receiving an impulse response from headwear communicatively coupled to the device in response to the test signal.

20. A method, comprising:
- detecting, by utilizing a processor and based on a change in a characteristic of an acoustic signal occurring in an acoustic environment, an acoustical dampening of the acoustic signal between the acoustic environment and a microphone of a device, wherein the acoustical dampening of the acoustic signal results in a damped acoustic signal, wherein the acoustical dampening is facilitated by an acoustic dampening element in a path between the acoustic environment and the microphone of the device; and
- applying, by utilizing the processor, a compensation filter to the damped acoustic signal to form a compensated acoustic signal that is reproduced, wherein the compensation filter approximates an inverse of the acoustical dampening.

* * * * *